(12) United States Patent
Mihaylov et al.

(10) Patent No.: US 6,981,689 B2
(45) Date of Patent: Jan. 3, 2006

(54) HYBRID FLOW METERING VALVE

(76) Inventors: Gueorgui Milev Mihaylov, 1745 Lake Christopher Dr., Virginia Beach, VA (US) 23464; Evdokia Kirilova Mihaylov, 1745 Lake Christopher Dr., Virginia Beach, VA (US) 23464

( * ) Notice: Subject to any disclaimer, the term of this patent is extended or adjusted under 35 U.S.C. 154(b) by 0 days.

(21) Appl. No.: 10/820,959

(22) Filed: Apr. 8, 2004

(65) Prior Publication Data

US 2005/0224737 A1 Oct. 13, 2005

(51) Int. Cl.
*F16K 47/00* (2006.01)

(52) U.S. Cl. ...................................... 251/126; 137/556
(58) Field of Classification Search ............. 251/126; 138/43, 46; 137/556, 556.3, 556.6
See application file for complete search history.

(56) References Cited

U.S. PATENT DOCUMENTS

| | | | |
|---|---|---|---|
| 2,447,920 A | * | 8/1948 | Terry ........................... 138/43 |
| 2,827,919 A | | 3/1958 | Rice et al. |
| 3,428,291 A | * | 2/1969 | Callahan, Jr. et al. ...... 251/122 |
| 3,441,249 A | * | 4/1969 | Wilfred ...................... 137/556 |
| 3,841,354 A | * | 10/1974 | McDonnell ................. 251/126 |
| 3,910,553 A | | 10/1975 | Boylan |
| 4,044,991 A | * | 8/1977 | Waller ........................ 251/122 |
| 4,171,006 A | | 10/1979 | Steere |
| 4,311,170 A | | 1/1982 | Dolan |
| 4,340,234 A | | 7/1982 | Ise |
| 4,406,442 A | | 9/1983 | Bettin et al. |
| 4,495,965 A | | 1/1985 | Ise |
| 4,500,068 A | | 2/1985 | Rasmussen et al. |
| 4,506,423 A | * | 3/1985 | Nakamura et al. .......... 251/126 |
| 4,601,310 A | * | 7/1986 | Phillips ...................... 137/556 |
| 4,632,359 A | * | 12/1986 | Tooth ......................... 251/126 |
| 4,634,434 A | * | 1/1987 | Marino et al. .............. 251/126 |
| 5,141,027 A | * | 8/1992 | Magnasco ................... 251/122 |
| 5,244,182 A | | 9/1993 | Pacht |
| 5,249,773 A | | 10/1993 | Feld |
| 5,687,949 A | | 11/1997 | Dukas et al. |
| 6,644,620 B2 | * | 11/2003 | Johnson et al. ............. 251/126 |

* cited by examiner

Primary Examiner—John Bastianelli (57) ABSTRACT

Presented is a flow metering valve that can precisely and accurately regulate the volume of the fluid-flow through entire range of measured flows. The valve comprises tubular body and moving stem in it. One end portion designated as a leading has threadely engaged stem and body. Another portion designated as a regulating has body with the stem extended to fill the tubular space longitudinally separating inlet and outlet ports. At least one of the surfaces—the inner of the body or the outer of the stem—is threaded and have their threads truncated by tapering truncation from the crest to the root. The truncated thread forms channel having cross-section tapering from one port to the other. The axially moving stem gradually changes the cross-section of the channel providing variable flow communication between the two ports. The fluid flow changes proportionally to the cross-section of the formed channel. The valve provides very fine regulation of the flow within four orders of magnitude.

10 Claims, 10 Drawing Sheets

HYBRID FLOW METERING VALVE

BACKGROUND OF THE INVENTION

1. Field of Invention

The present invention relates generally to fluid flow valves and more precisely pertains to fine regulation metering valves and especially to the valves that can provide extremely precise regulation over a large range of regulated flows.

2. Description of the Prior Art

When accurate control of relatively low flow rates is required it is wide spread practice to employ needle valves for this purpose. Different types and improvements of the needle valves serves well this purpose because of the fine adjustment and accurate control provided by such valves.

For regulating extremely low flow the needle valves are used with very small orifice and literally needle type of stem—U.S. Pat. No. 5,687,949 issued to Dukas et al, U.S. Pat. No. 3,910,553 to Boylan, U.S. Pat. No. 4,311,170 to Dolan. This needle is providing gradually changeable annular space between the stem and the seat of the valve. The maximum flow is restricted by the internal diameter of the seat. Despite of other improvements like spring supported seat, aiming to stabilize the functioning—U.S. Pat. No. 4,500,068 to Ramundsen et al, it is obvious that such limited space for the flow passage can tolerate very narrow interval of low fluid flows.

The same drawback—regulation of only low flow in a narrow interval—characterizes low flow valves having regulating notches or passages such as U.S. Pat. No. 4,406,442 to Bettin et al. Even with shut-off function the valve is capable to provide regulation in a very narrow interval. The flow-dynamic resistance of those valves is high and limited by the full bore of the created orifice.

In a more complicated construction—fine grooves with adjustable length are used for regulating very low flows U.S. Pat. No. 4,495,965 and U.S. Pat. No. 4,340,234 to Ise. Despite of the claim that the valve can regulate big flow range, this range is still limited by the naturally small cross-section of the groove compared to the inlet and outlet cross-sections.

For fine adjustment of the low flow, valves utilizing flexible tubing compressed by specially shaped surfaces U.S. Pat. No. 4,171,006 to Steere Jr. and U.S. Pat. No. 2,827,919 to Rice are suggested. Drawback of those devices is the deviation of the adjusted flow at any new position due to the memory of the plastic tubing and inconsistency of the flow (due to the mechanical properties of the plastic or resin) changing with the temperature of the fluid.

Based on similar principals, valves with cone-shaped stem are also referred as needle valves U.S. Pat. No. 5,249,773 to Feld, U.S. Pat. No. 5,244,182 to Pacht, with some decreased accuracy but used with higher flow rates. Those types of cone/needle valves are more appropriate for the moderate range of flows but fail to provide fine regulation in a very low flow mode. Their highest flow rate is still limited by the bore of the orifice, which is always smaller than the full bore of the inlet/outlet of the valve therefore providing additional flow resistance.

It is known from the prior art that the valves with capability of providing full flow, or ball valves, or hollow cylinder as a stem, are well accepted to regulate roughly high flows but completely fail to provide fine regulation. One skilled in the art knows that for each range of flow, valve with different construction and respective accuracy is used. The known art does not provide a valve with fine regulation and especially metering capability for very high, moderate and very low flow ranges all together.

Objectives and Advantages

It is a primary objective of the present invention to provide a solution for smooth, fine, accurate and repeatable regulation and measuring function over a broad range of flows. The low range must start from zero and the top range is to be limited by the full-bore opening of the inlet/outlet of the valve. Such valve will provide regulation over a flows ranging up to four orders of magnitude.

Another object of the present invention is to exploit different designs having the same basic concept, functions and abilities, but serving different needs thereby to develop a family of valves having same theoretical and functional background.

Consecutively another object of the present invention is to provide easy technologically achievable solutions for manufacturing such family of valves as well as materials for building such valves. Further objects and advantages of the present invention will become apparent from consideration of the drawings and ensuing description.

SUMMARY OF THE INVENTION

The present invention provides a novel apparatus for fine regulation of flow incorporating a body tubular inside. One substantial portion of that tubular space is internally threaded and a cylindrical stem with corresponding thread engaged in it. This portion is designated as moving (guiding) portion. Another substantial portion of that tubular inside space is connected to two ports—inlet and outlet. The inlet port axis is perpendicular to the tubular space axis. The outlet axis is either perpendicular or the same as a tubular one. The inlet and outlet are separated by substantial distance which is designated as regulating portion of the tubular space.

Important characteristic of the present invention is that the cross-section of the inlet and outlet ports is slightly smaller than the cross-section of the tubular regulating portion. This way the fluid passage between the two ports has no restrictions when the valve is fully opened. Part of the stem is proliferated from the moving portion to the regulating portion. The part of the stem which is engaged into the regulating portion of the tubular body has length slightly bigger than the distance between inlet and outlet ports, thereby to be able completely to fill the regulating portion when the stem is fully extended between two ports and to close the inlet port.

Further, one or both of the engaged into regulating portion two surfaces—the tubular one and the surface of the stem—are threaded. When both of them are threaded, the pitch of the thread is the same as the pitch of the threads in the moving portion. In a regular thread irrespective of its class of tolerance, there are two helical capillary channels along the threaded line. One of them—between the external thread root and internal thread crest—is specified as "root clearance". The other—between external thread crest and internal thread roots—is specified as "crest clearance". The purpose of those clearances is to provide capillary space for lubrication and to facilitate the manufacturing of the threaded parts. However, threads without those capillary channels can provide very tight fit. In case where one or both of the threads are truncated with tapering truncation, one or both of those clearances will change their cross-section along the thread providing fluid path with tapering longitudinally cross-section. This concept is adopted to form flow path with mentioned longitudinal change.

Further, one or both threaded surfaces in the regulating portion have their thread substantially truncated. For the body this truncation is tapering from the major diameter of internal thread to diameter smaller than minor diameter of internal thread. For the stem the thread is truncated tapering from the major diameter of external thread to diameter smaller than the minor diameter of external thread. This way when the stem and body threads are engaged, a grove with gradually changed cross-section is formed along the backlash of the joined thread. The distance of this tapering truncation is shorter than the distance between two ports—inlet and outlet.

The end of the regulating portion of the stem extends further from the truncated thread and tapers as cone or ogival bullet-shaped surface. This surface, when the valve is completely closed, seals matching annular surface seat on the axial port. When the "shut-off" function is not necessary, the axis of both ports can have an angle with the axis of the tubular body. The valve is operating by rotating the stem thereby moving the stem in the regulating portion "in" or "out".

By slightly rotating backward from "shut-off" position, capillary-looking backlash is formed along the truncated or tapered thread. The length and average cross-section of this backlash is proportional to the length of the inserted into regulating portion stem. Very fine regulation for the very low flows is achieved. By further rotation of the stem the shape and volume of the front ogival surface of the stem is acting more similarly to the needle valve, performing very fine regulation of moderate flow. Finally the stem is engaged with its tapering part providing regulation only as conical valve until the space between the two ports is completely free. The valve is completely opened and has very low fluid-dynamic resistance.

Term "thread" in this case should be understand largely rather than the standard technical use, as a spiral grove not necessary defined by regular pitch, and applied to any profile of the thread—triangle, square, rectangular, trapezoid, oval, semicircle etc.

BRIEF DESCRIPTION OF THE DRAWINGS

The foregoing and other features and advantages of the present invention will be apparent from the detailed description of the present invention contained herein below, taken in conjunction with the drawings where

FIG. 4-A fully closed valve—shut-off position
FIG. 4-B low flow position of the stem
FIG. 4-C moderate flow position of the stem
FIG. 4-D high flow position of the stem;

FIG. 5-A is a schematic of the stem and body both with truncated threads and sealing seat in the body FIG. 5-B is a schematic of the tapered truncated thread on the stem and regular thread on the body FIG. 5-C is a schematic of smooth body and stem with tapering crest of the thread FIG. 5-D is a schematic of smooth body and tapering truncated thread of the stem FIG. 5-E is a schematic of smooth body and tapering square thread FIG. 5-F is a schematic of smooth body and tapering rounded profile thread;

REFERENCE NUMERALS

20. Stem
20A. Conical/ogival front sealing part of the stem
20B. Regulating portion of the stem
20C. Threaded portion of the stem with leading thread
20D. Non-threaded cylindrical part of the stem
20E. Groove for O-ring on the stem
20F. Sealing surface of the stem
20G. Thin neck portion of the stem
21. Regulating sabot—part of the stem
22. Body of the valve
22A. Regulating portion of the body
22B. Body-insert
22C. Smooth bore portion of the body or insert between leading and regulating portions
22D. Sealing surface of the seat in the body or the insert
22E. Threaded part of the body with leading thread
24. Bonnet
25. Packing nut
26. O-ring
27. Packing seal
30. Micrometer handle
32. Vernier handle
34. Scale-barrel
35. Micrometer barrel
36. Union nut
38. Screw lock of the handle
40. Fluid path—passage formed along regulating portion of the thread
41. Inlet port
42. Inlet coupling assembly
43. Outlet port
44. Outlet coupling assembly
45. Annular space around the stem connected to outlet port

DESCRIPTION AND FUNCTION OF THE MAIN EMBODIMENTS

Referring more particularly to the drawings wherein the showings are for the purpose of illustrating the invention only as well of explaining its function, and not for the purpose of limiting the same.

A comon in all embodiments on FIGS. 1, 2, 3 and FIGS. 6, 7, 8, 9, 10 is a valve having body 22 with longitudinal tubular cavity. Portion of this cavity is threaded with thread designated as leading thread 22E and regulating portion 22A. The two sides of regulating portion 22A are connected to two ports only conditionally stipulated as inlet 41 and outlet 43 ports. The threaded leading portion is separated from the regulating portion by smooth bore cylindrical portion 22C. In some particular embodiments the regulating portion is adjacent to the leading portion as its extension. The regulating portion 22A can be threaded or smooth. Threaded regulating portion has the same pitch as the leading one.

A substantially cylindrical stem 20 is mounted into longitudinal tubular cavity of the body 22. The stem has a threaded portion 20C engaged with respective body leading thread 22E, adjacent to one end of smooth cylindrical portion 20D, the other end of which is adjacent to regulating portion 20B. In some particular embodiments the tread of the leading portion 20C is extended over the regulating portion 20B and has the same pitch as the leading one.

Figure 1:
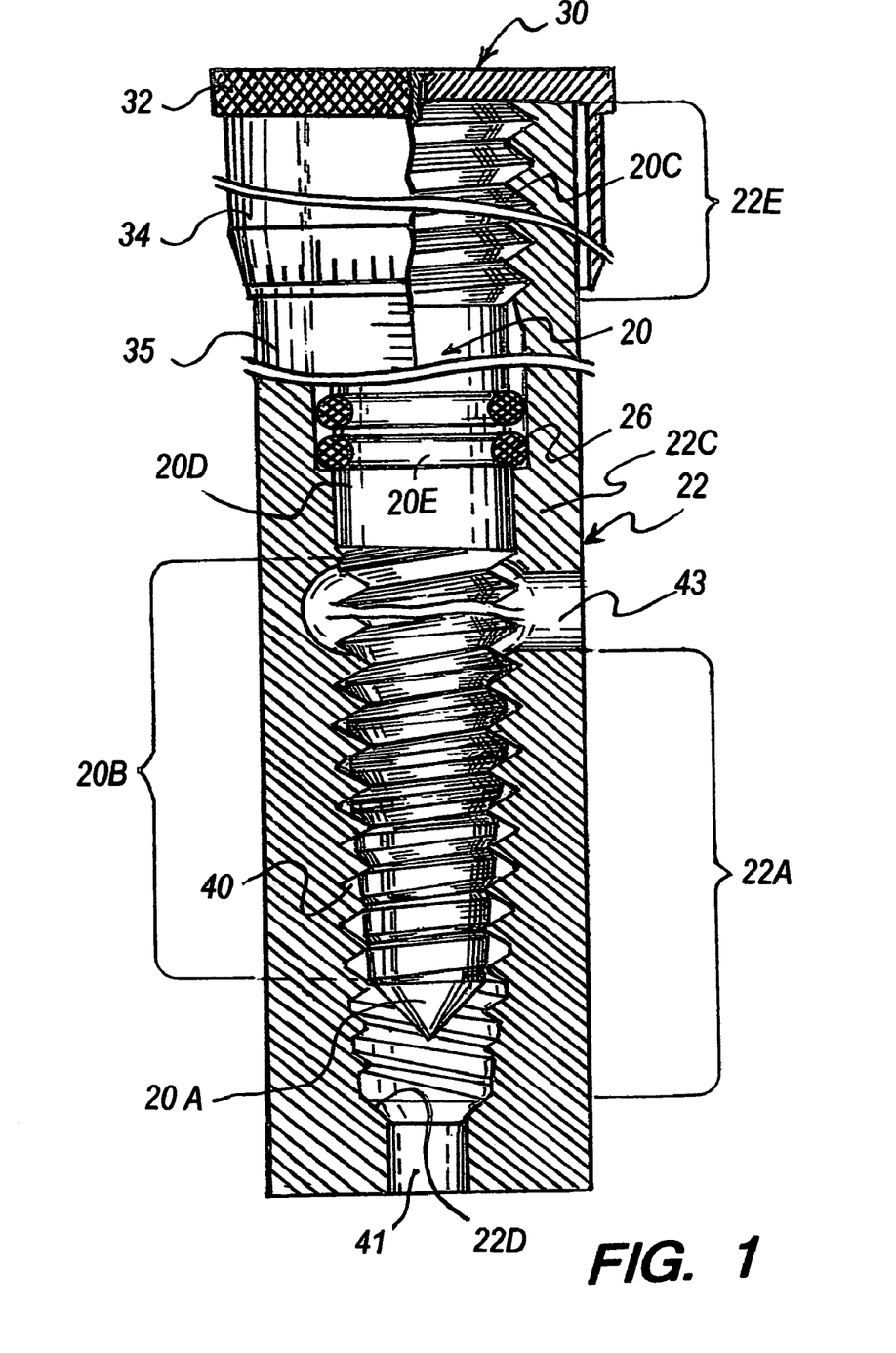
FIG. 1 is a sectional view of the flow metering valve with threaded regulating portion of the stem and the body.

The preferred embodiment illustrated on FIG. 1 has mutually engaged leading portions of the body 22E and of the stem 20C. The leading portion of the body thread 22E is separated by substantially cylindrical portion 22C from the threaded regulating portion 22A. This threaded regulating portion 22A of the body 22 is engaged with threaded regulating portion 20B of the stem 20. The crest of the thread on the stem 20 is truncated tapering from major diameter of external thread to lesser than minor diameter of external thread with transition to front conical sealing surface 20A of the stem, which can tight the body seat 22D. A channel 40 is formed along the truncated thread of the stem 20 and the regulating portion of the body 22. This channel is connecting inlet 41 and outlet 43 and serves as a fluid path.

Figure 2:
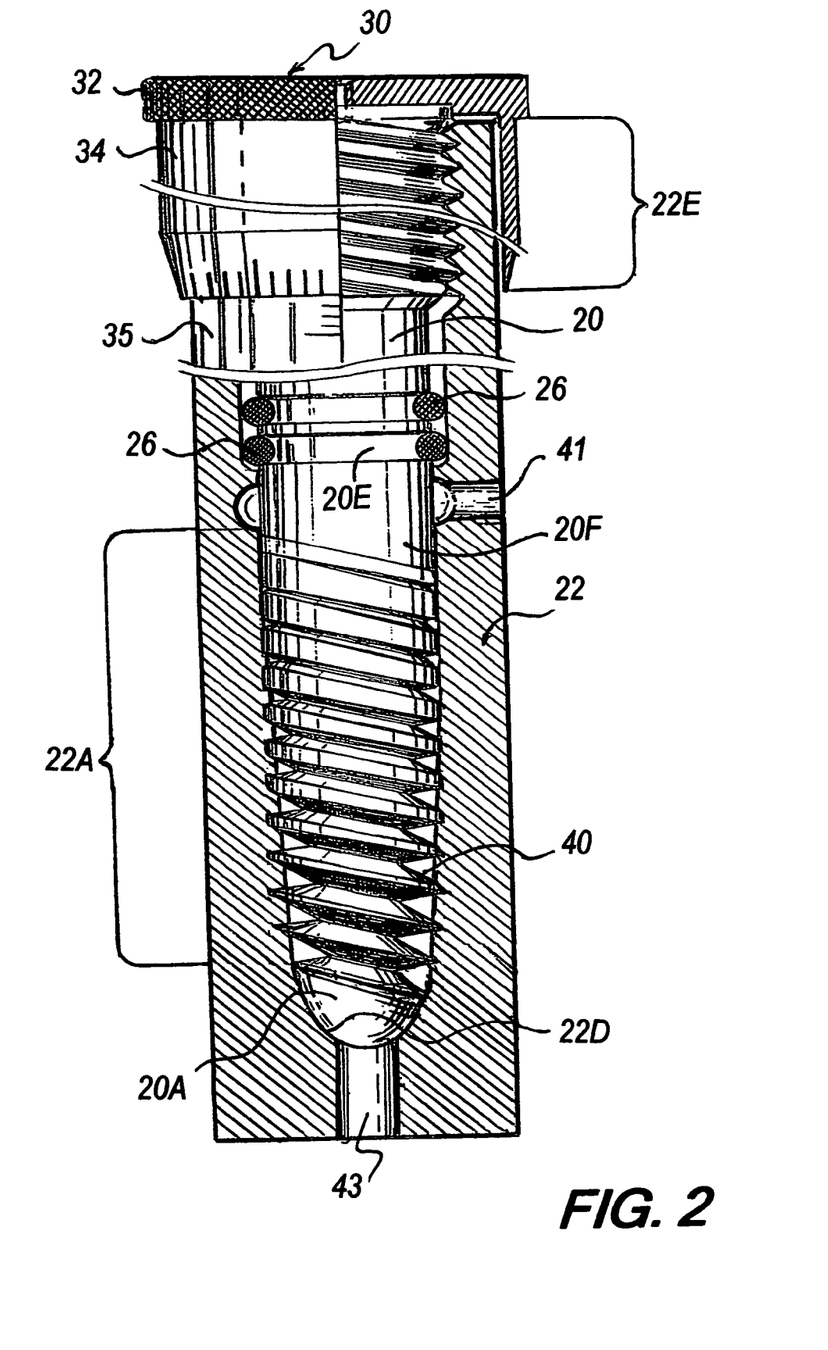
FIG. 2 is a sectional view of the flow metering valve assembly with threaded regulating portion of the stem and tapering regulating portion of the body.

Similar to the embodiment shown on FIG. 1 is the valve pictured on FIG. 2. The main difference is the way of forming the flow path 40. In this embodiment the root of the stem's thread is tapering from major diameter of external thread to lesser than minor diameter of external thread with transition to front ogival sealing portion 20A. This portion seats and tightly seals corresponding body seat 22D. The regulating portion 22A of the body is threaded with matching the stem pitch internal thread. The crest of this thread is tapering from major diameter of the internal thread to lesser than minor diameter of the same thread transitioning to body sealing seat 22D.

Figure 3:
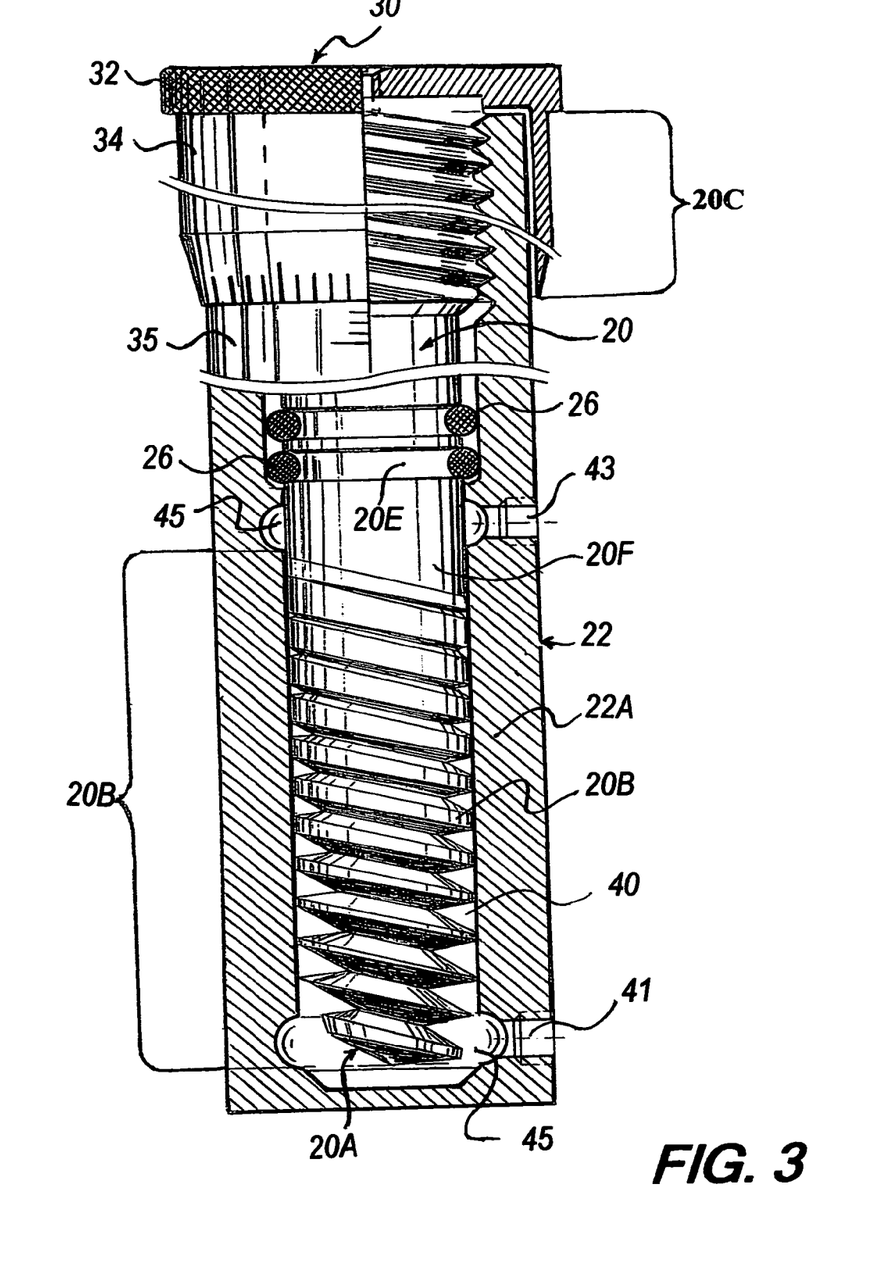
FIG. 3 is a sectional view of the flow metering valve with threaded regulating portion of the stem and smooth regulating portion of the body.

Another close to both discussed embodiments is interpreted on FIG. 3. The threaded stem is engaged with sliding fit into substantially smooth cylindrical regulation body portion 22A. The flow path 40 is formed as channel with tapering cross-section between the surface of the smooth cylindrical regulating body portion 22A and tapering threaded stem portion 20B. This embodiment suggests technological and maintenance easiness. All embodiments explained on FIGS. 1, 2, 3 have micrometric means 30 fixed to the stem for accurate positioning of the stem 20 into the body 22, therefore very fine regulation of the cross-section of flow path 40.

Figure 4:
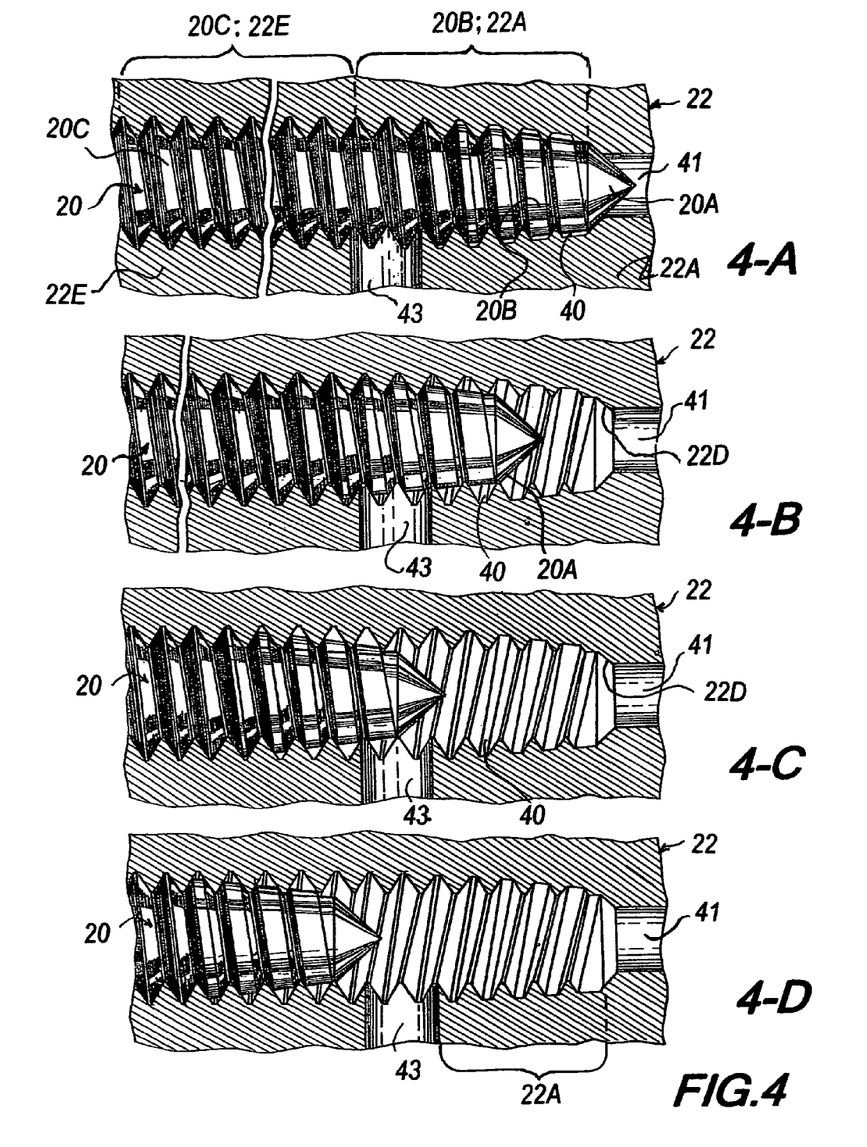
FIG. 4 is a schematic of generic valve embodiment illustrating four phases of action of the valve upon present invention.

The basic concept of regulation for all above described valves is illustrated on FIG. 4 by showing the main parts—body 22 and stem 20 of one generic embodiment—in four consecutive positions of engagement.

On FIG. 4-A which represents "shut-off" position, the stem 20 is moved to the end of the thread and its front conic surface 20A seals the corresponding surface 22D, seen better on FIG. 4-B, adjacent to inlet 41 or outlet 43 ports. The tight fit between 20A and 22D is separating the inlet and the outlet ports from the fluid path 40, formed as a backlash or channel between the crest and roots of both threadely engaged body 22 and stem 20. The distance between the inlet port and outlet port includes at least one complete turn of the stem but preferably includes 3 to 15 or more peach steps corresponding to same quantity fill rotations of the stem.

On FIG. 4-B the stem 20 is shown after several turns backward from the "shut-off" position wherein the sealing surfaces 20A and 22D are separated. The port 41 is fully opened and a fluid path 40 is formed along the spiral line between the crest of the thread of stem 20 and the root of the thread in body 22. It is well seen that the formed fluid path 40 have a changeable cross-section and length. The flow in fluid path is controlled therefore by the smallest cross-section of this channel and the friction of the fluid with channel walls.

On FIG. 4-C the stem 20 is shown after several more turns backward. One end of the passage 40 is transformed to annular space between the stem 20 and the body 22. The flow is controlled by the cross-section of the annular space defined between the front sealing surface of the stem and the internal surface of the body.

On FIG. 4-D the stem is shown in completely opened position when the inlet and outlet ports are connected by full bore diameter which cross-section is bigger than any of the inlet or outlet ports.

It should be well understand that FIG. 4 is illustrating the main concept of functioning of the valve according to the present invention irrespective of any particular embodiments shown further. From fully "shut-off" position on FIG. 4-A when the flow is zero, through gradually enlarging fluid path cross-section and shortening its length leading to slow and gradually increasing flow on FIG. 4-B, then to partially opened annular channel determining much bigger flow change on FIG. 4-C, and finally, to fully opened full bore space determining the maximum flow at the given pressure difference between inlet and outlet ports on FIG. 4-D. In order to minimize the axial force and cavitation effects of the flow, especially when a liquid is used as fluid, the side port 41 is more preferred to be used as inlet port and axial 43 as outlet port. However the use of the ports by opposite way could have its convenience for example when valve is used to control gas flow through rotameters. The indications "inlet port" and "outlet port" are more for better understanding, rather than functional necessity.

Figure 5:
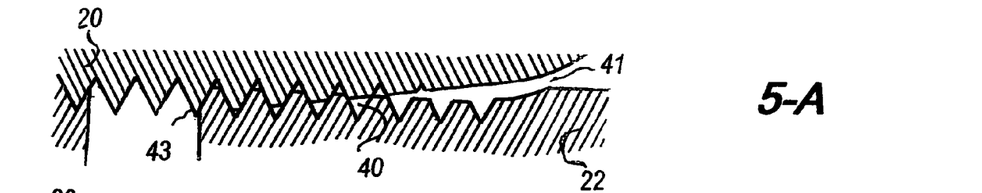
FIG. 5 is a schematic cross-section along the axis of a generic valve demonstrating a variety of possible fluid paths.

On FIG. 5 are shown some generic shapes of cross-section of the fluid path 40. The exhibited cases on FIGS. 5-A,B,C,D,E,F do not exhaust the multitude of the possible engagements and respective shapes of path 40. The common feature for all of them is the change of the cross section of the fluid path as function of the length extended between the two ports.

Figure 6:
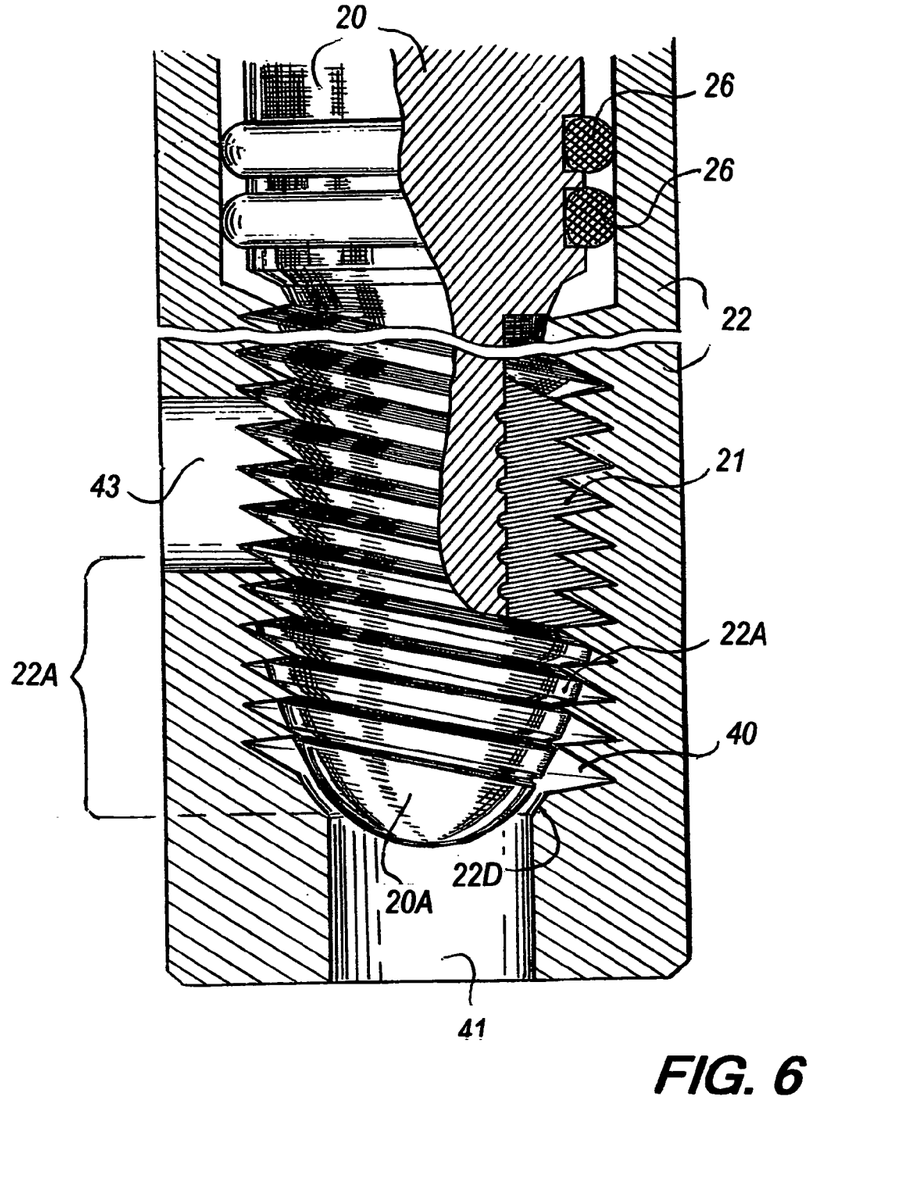
FIG. 6 is a section of the body or body insert with view of the inserted stem with threaded tapering sabot in low to moderate flow position.

FIG. 6 represents an embodiment allowing easy manufacturing by casting or injection molding of the fine regulating sabot 21 having tight press-fit over the stem 20. This sabot can be changed during regular maintenance of the valve not interfering with the integrity of the other more expensive parts of the valve. Appropriate material for the sabot 21 is a plastic or metal alloy with low coefficient of friction.

Figure 7:
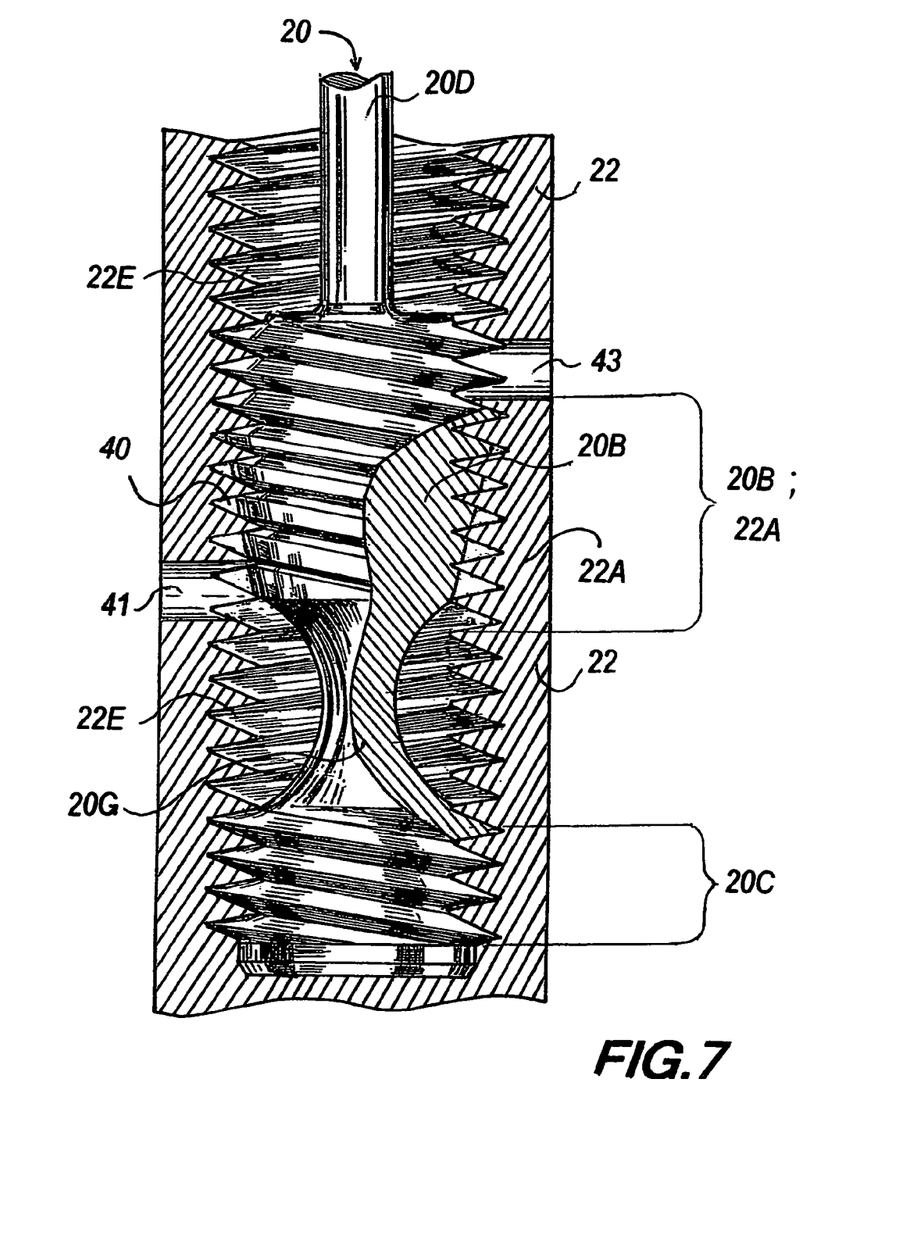
FIG. 7 is a sectional view of the valve assembly with stem having separated leading thread from the regulating thread by thin neck.

On FIG. 7 another version of the regulating part of the valve is interpreted. The leading part of the stem thread 20C is separated from the regulating part 20B by thin neck portion 20G. The seal between the body and the stem is realized along the extended cylindrical portion 20D of the stem, not evinced on the diagram. This valve is designed for very low to moderate flows. Advantageous of this design is the convenience of mass-manufacturing such type of threaded body and stem.

Figure 8:
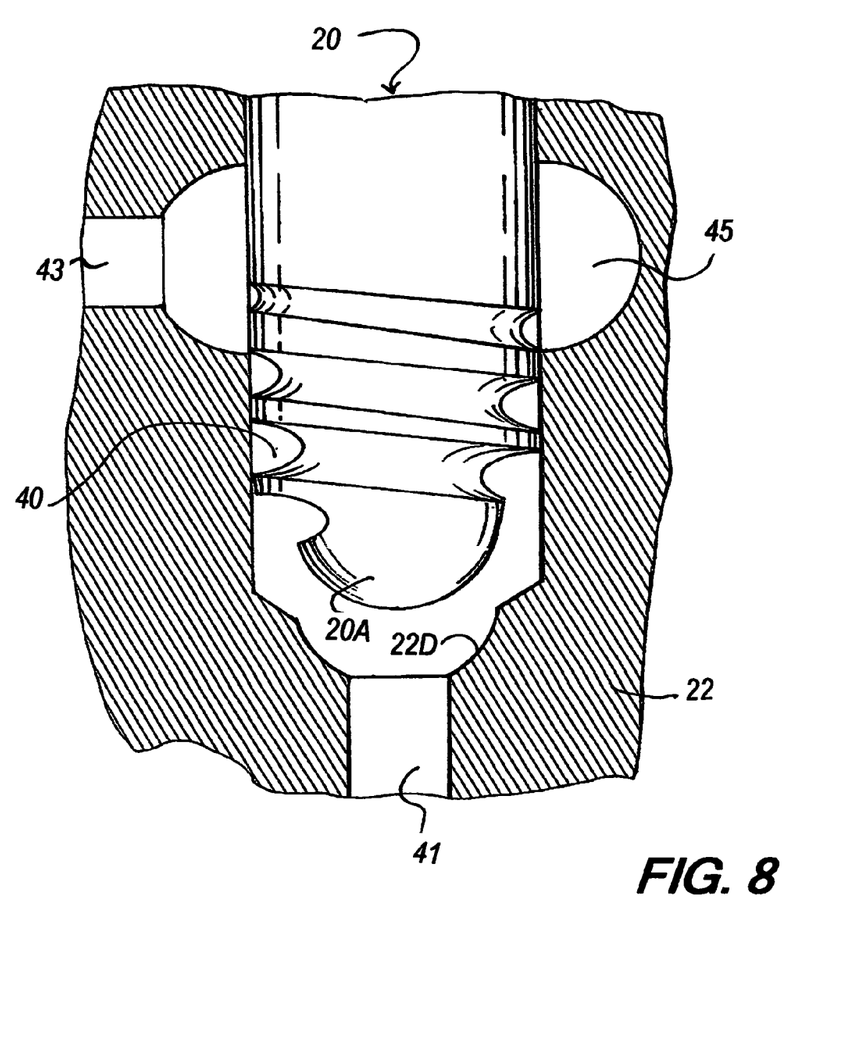
FIG. 8 is a sectional view of the valve with tapered thread on the regulating part of the stem and smooth bore regulating portion of the body.

FIG. 8 shows another preferred embodiment of the valve upon present invention. The regulating portion of the body is substantially cylindrical and has sliding fit with the threaded stem. This embodiment can provide very good control for the lower flow range yet is constructed for high and very high flows at low pressure difference between the inlet and outlet ports. The annular space 45 around the stem 20 connected to the port 41 helps very high flows to be handled with considerable accuracy.

Figure 9:
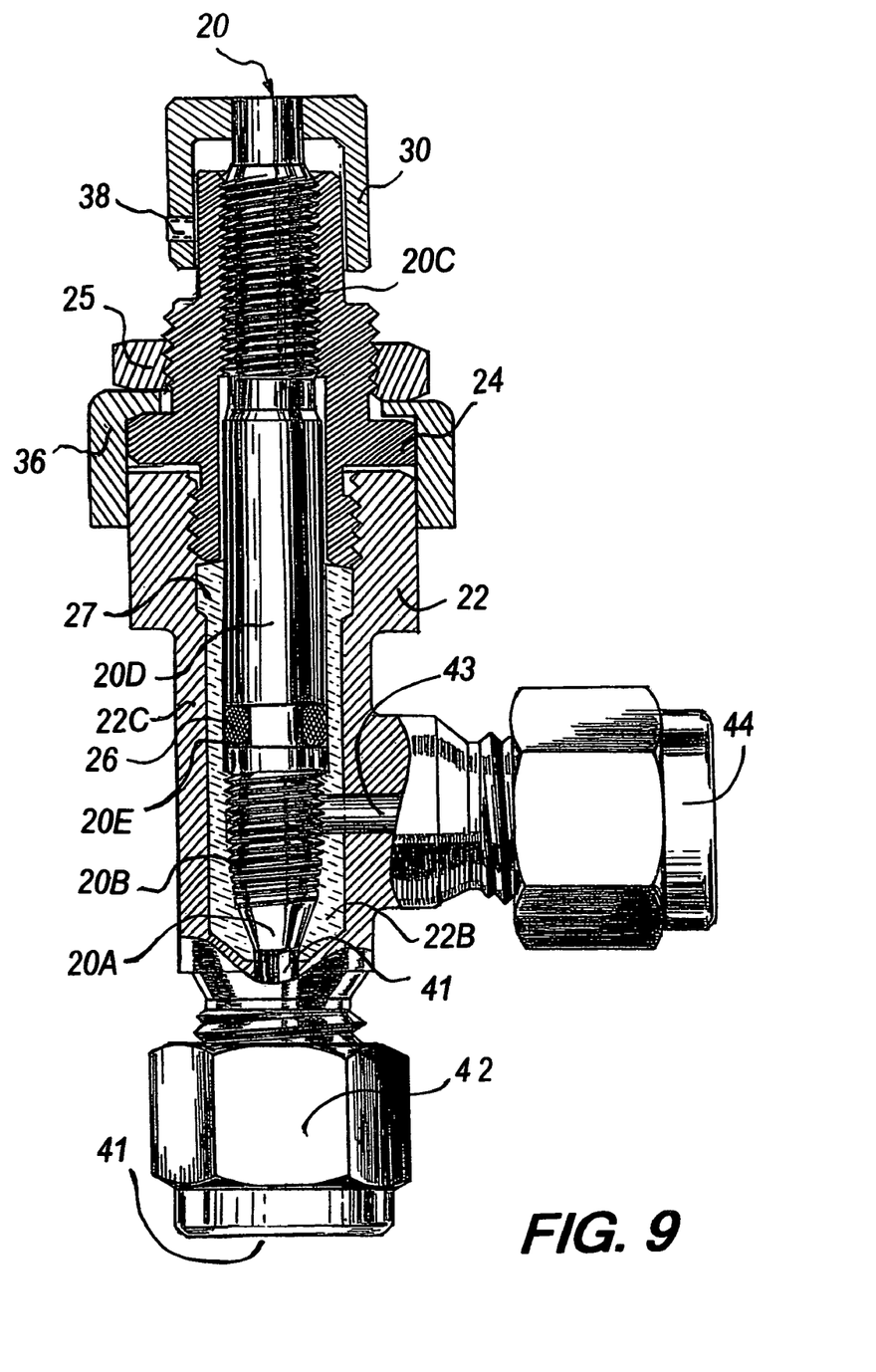
FIG. 9 is a sectional view of the full in-line assembly of the preferred embodiment of the valve in which the moving part of the stem is separated from the regulating part by cylindrical portion and seals—o-rings.

FIG. 9 delineates one more complete assembly of the valves depicted on FIG. 1, 2, 3. All coupling parts and mounting details are illustrated for better understanding of the construction and functioning of the valve. The body-insert 22B has to be machined in fine and accurate manner from different but compatible with the body material as self-lubricated plastic or metal. The present invention does not intend to specify any particular materials, rather to take advantage of their known features. In this embodiment the regulating portion 20B of the stem is separated from the leading one 20C by smooth cylindrical portion 20D. The surface of this portion is sealed by the pressure over the packing seal 27 being part of body-insert 22B. The body-insert is made from above mentioned material with low coefficient of friction—nylon, molybdenum sulphide filled nylon, PTFE, PTE, polypropylene or alike. Pressurizing power over seal 27 is provided by bonnet 24. Additional sealing is provided by O-ring 26 seated in the grove 20E. The regulating portion 20B of the stem 20 is truncated similar to the threads shown on FIG. 2 and is functioning the same manner.

Figure 10:
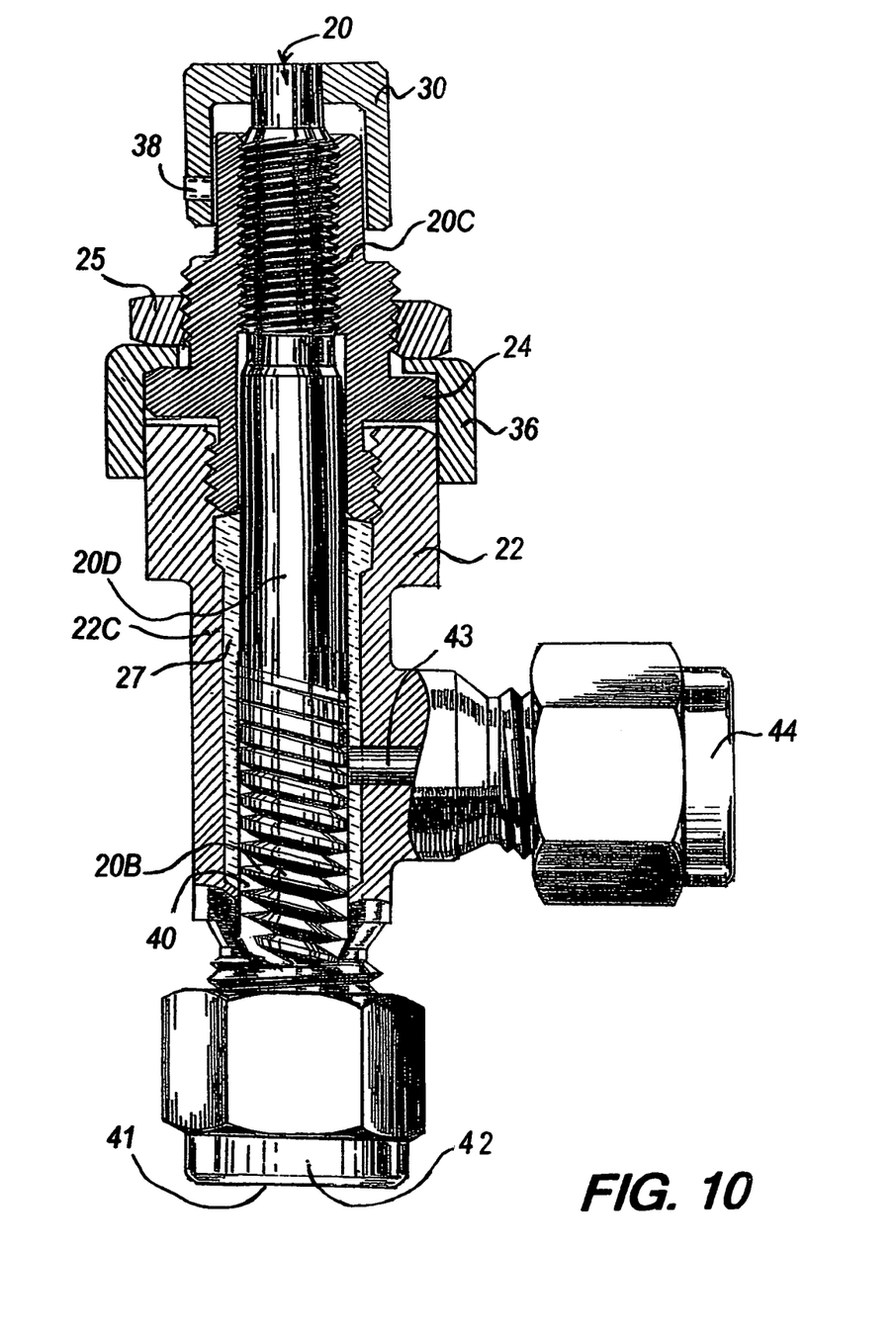
FIG. 10 is a sectional view of the full in-line assembly of the preferred embodiment of the valve having stem and body with leading threads and non-threaded regulating part of the body.

FIG. 10 shows full assembly of a valve upon present invention in which the leading portion of the stem 20C is separated from regulating portion 20B only by cylindrical portion of the stem similar to one shown on FIG. 9, but no O-rings are used. The axial pressure over the seal 27 of elastic body-insert provided by bonnet 24 shrinks the diameter of the seal over the smooth surface 20D of the stem, therefore seals the inner and outer cylindrical surfaces without necessity of o-ring. The regulating portion of the stem is acting similarly to the one of the valve shown on FIG. 3. The "shut-off" function is executed in the position when non-threaded cylindrical portion of the stem is covering completely port 41.

In both cases shown on FIG. 9 and FIG. 10 the valve has connecting fittings 42 and 44 for in-line assembly. It should be understand by one skilled in the art, that the same variety of regulating combinations between threaded stem and non threaded body or insert can be provided by threaded body and smooth stem upon technological and/or exploitation requirements.

All versions of the valve upon present invention shown and discussed above are capable of providing fine regulation of the fluid flow from very low to the maximum high level restricted only by diameters of inlet/outlet couple at a given pressure difference. This way the valve at the present invention is outperforming any needle-type or another construction valve in accuracy, precision and flow range. It should be understand that the spirit of the present invention includes any valve which partially or in full can regulate the flow by controlling the length and/or cross-section of the spiral backlash or channel formed along tapering truncated thread between inlet and outlet of the valve.

What is claimed is:

1. A hybrid flow metering valve comprising:
 a) a body having an inner tubular space along the main axis of the body thereof and having said tubular space divided to at least two substantially different portions—first one substantially threaded designated as leading portion and second one which can be internally threaded or smooth, designated as regulating portion; at least two interchangeable ports—one inlet port and one outlet port in fluid communication with said regulating portion of said tubular space and being separated longitudinally by internally threaded or smooth cylindrical surface;
 b) a cylindrical stem having at least two substantially different portions longitudinally on its surface: first one—substantially threaded with the same pitch as said body and congruently engaged with said body threaded surface thereof designated as leading portion and second one which can be smooth or threaded, proliferating longitudinally into said second portion of the body between said inlet and outlet ports designated as regulating portion;
 c) said leading portion of said stem having zero backlash fit with congruently engaged body leading portion thereof defining leading thread capable to move longitudinally said stem into said regulating body portion upon rotation of said stem and said regulating portion of the stem being threaded or smooth is engaged threadedly or slidably with corresponding said regulating portion of said tubular space;
 d) at least one of the mutually engaged said regulating portions of said tubular space and said regulating portion of said stem is substantially threaded;
 e) at least one of said substantially threaded surfaces has its thread substantially truncated with tapering truncation—for the internal thread, from the major diameter of internal thread to the diameter equal or lesser than minor diameter of internal thread and for the external thread, from the major diameter of external thread to diameter equal or lesser than minor diameter of external thread;
 f) said mutually engaged regulating body portion and said regulating stem portion defining at least one spiral backlash or groove along said tapering truncated thread and said backlash or groove being with tapering cross-section;
 g) said tapering cross-section defining tapering flow passage between said inlet and outlet ports and said cross-section of said tapering flow passage being a function of the length of said stem engaged between said two ports therefore function of rotation of said first part of said stem into said regulating portion of the body;
 h) said stem having conical or ogival front part adjacent to said truncated threaded portion and said front part extended beyond said outlet port when said stem fills completely said space between said inlet and outlet ports and seals hermetically a sit with corresponding shape defined into said tubular space;

i) said stem having a means for rotation mounted on extended out of said body part of said stem, so that by rotation of said means, said stem will axially move into the space between said inlet and said outlet ports, whereby providing full range of flow regulation from "shut-off" position when said stem completely fills said space, then very "low flow" position along the backlash capillary channel when said stem is partially removed from said space, then "moderate flow" position when said stem is inserted only partially into said inlet port by said front portion and "full flow" position when said stem with said front portion is removed completely and said space is full with fluid.

2. The valve as set in claim 1 wherein said leading and regulating portions of said stem are separated by smooth cylindrical part of said stem which is slidably fitted into corresponding smooth bore inner portion of said body whereby to provide fluid tightness of the assembly between said leading portions of said stem and said body and said regulating portions of said stem and said body.

3. The valve as set in claim 1 wherein said smooth cylindrical portion of said stem has grooves for o-rings whereby to isolate fluidly said leading from said regulating portions of the valve.

4. The valve as set in claim 1 wherein said body of the valve is composed as plurality of coaxial mounted portions whereby to provide easy assembly, accessibility and maintenance.

5. The valve as set in claim 1 wherein in said regulating portion of the body is formed annular space around said regulating part of said stem and said annular space has a cross-section substantially close to that of the fluidly connected to said inlet port.

6. The valve as set in claim 1 wherein said stem has a portion extended out of said body assembly designated to be connected with means for regulation further comprising:

a) a micrometric handle for rotation of said stem;

b) a micrometric scale over micrometric barrel for measuring the degree of that rotation and therefore degree of the insertion of said regulating portion of the stem into said regulating portion of said tubular space.

7. The valve as set in claim 1 wherein the cross-section of said inlet and outlet ports is permanent and substantially the same or smaller compared to the cross-section of said annular space and said inner tubular space and to said regulating portion of the tubular space thereof.

8. The valve as set in claim 1 wherein said conical or ogival front portion of said stem completely seals said inlet/outlet port when being axially pressed to corresponding congruently shaped sit adjacent to said inlet/outlet port.

9. The valve as set in claim 1 wherein said regulating part of said stem is secured as a sabot tightly fitted to the stem and having same shape and function as said regulating part; said sabot is engaged within said regulating portion of the body; said sabot is made from material with low coefficient of friction—one of group including brass, acetal, nylon, molybdenum sulphide filed nylon, PTFE, PIE, polypropylene whereby enhancing the operation ability and easing the maintenance.

10. The valve as set in claim 1 wherein said regulating portion of the body is designed with tightly fitted insert having same shape and same functions as said regulating portion of the body and said stem has its regulating portion engaged with said body insert and said body insert is made from material with predetermined low coefficient of friction—one of group including brass, acetal, nylon, molybdenum sulphide filled nylon, PTFE, PTE, polypropylene whereby enhancing the operation ability and easing the maintenance.

* * * * *